UNITED STATES PATENT OFFICE.

JOSEPH C. JENKINS, OF HUMBOLDT, TENNESSEE, ASSIGNOR OF ONE-HALF OF HIS RIGHT TO DAVID T. TRIPP, OF WATERLOO, ILLINOIS.

PROCESS OF TEMPERING STEEL.

SPECIFICATION forming part of Letters Patent No. 223,738, dated January 20, 1880.

Application filed November 21, 1879.

*To all whom it may concern:*

Be it known that I, JOSEPH C. JENKINS, of Humboldt, Gibson county, Tennessee, have invented a Process of Tempering, of which the following is a specification.

My invention has for its object to temper various articles of steel, as picks, springs, cutting-tools, anvils, &c.; and it consists in the use of certain materials, as I shall now proceed to describe.

The proportions and manner of applying the materials will vary according to the grade of steel and character of the implement, and where there is a tendency to blister additional ingredients may be used; but in all cases I employ three materials, to wit, nitrate of potash, (chemically pure,) cyanide of potassium, and yellow prussiate of potash.

For tempering picks I use four ounces of the nitrate of potash to two ounces each of the other ingredients, in a pulverized condition, applying to the pick first the powdered prussiate of potash, and then the powdered cyanide of potassium and nitrate of potash, while the pick, after being dressed and hammered, is at a low red heat. If then too cool, the pick is reheated to a red heat and then cooled in clean distilled water.

To facilitate the application the powdered substances may be combined with bees-wax, which answers as a vehicle to carry them.

In tempering edge-tools the materials are applied, and the steel then heated to a red heat, cooled, and immersed in water, when it is of the first blue color.

Springs are to be treated when the color is of a light blue.

For large and heavy articles the proportions are varied somewhat. For instance, in treating an anvil weighing one hundred and fifty pounds I use six ounces of yellow prussiate of potash, three ounces of nitrate of potash, two ounces of cyanide of potassium. The steel, when red-hot, is then sprinkled with the yellow prussiate, then with the nitrate, and then with cyanide, each after the other has melted, and if there are any signs of blistering an ounce of sulphate of zinc is applied. The anvil is then placed quickly in forty gallons of water, and cold water added to keep the temperature of the fluid below 120° Fahrenheit.

For each additional twenty-five pounds of weight of the block I add one-sixth to the above-named quantities.

I claim—

The tempering of articles of steel by the application of yellow prussiate of potash, nitrate of potash, and cyanide of potassium, substantially in the manner set forth.

In testimony whereof I have signed my name to this specification in the presence of two subscribing witnesses.

JOSEPH C. JENKINS.

Witnesses:
DAVID T. TRIPP,
THEODORE EBERMAN.